United States Patent [19]

Karlton et al.

[11] Patent Number: 5,835,717

[45] Date of Patent: *Nov. 10, 1998

[54] SYSTEM AND METHOD FOR SAVING STATE INFORMATION IN AN INTERACTIVE TELEVISION SYSTEM

[75] Inventors: Philip L. Karlton, Cupertino; Robert K. Myers, Santa Cruz, both of Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 572,297

[22] Filed: Dec. 13, 1995

[51] Int. Cl.$^6$ ................................. H04N 7/10; H04N 7/14
[52] U.S. Cl. .................... 395/200.47; 348/13; 348/12; 348/6; 455/5.1; 455/6.1
[58] Field of Search .................... 348/12, 13, 10, 348/6; 455/5.1, 6.1; 395/200.09, 200.47; H04N 7/10, 7/14

[56] References Cited

U.S. PATENT DOCUMENTS

| | | | |
|---|---|---|---|
| 5,539,451 | 7/1996 | Carey et al. | 348/13 |
| 5,563,648 | 10/1996 | Menand et al. | 348/12 |
| 5,600,364 | 2/1997 | Hendricks et al. | 348/12 |
| 5,619,249 | 4/1997 | Billock et al. | 455/5.1 |
| 5,635,979 | 6/1997 | Kostreski et al. | 348/13 |

*Primary Examiner*—John K. Peng
*Assistant Examiner*—Linus M. Lo
*Attorney, Agent, or Firm*—Sterne, Kessler, Goldstein & Fox P.L.L.C.

[57] ABSTRACT

A computer-based system and method for saving and restoring states in an interactive television system. The system presents interactive programs to a user; each program includes one or more states. When a user leaves a state in an interactive program by selecting a second state, the system saves state information sufficient to restore the first state. When the user elects to return to the first state, the system retrieves the state information and uses it to restore the first state; if the first state is not in the same interactive program as the second state, the system terminates the second state's interactive program and launches the first state's interactive program.

8 Claims, 7 Drawing Sheets

SYSTEM AND METHOD FOR SAVING STATE INFORMATION IN AN INTERACTIVE TELEVISION SYSTEM

BACKGROUND OF THE INVENTION

1. Field of the Invention

The present invention relates generally to interactive television systems and methods, and more particularly to an interactive television system and method for saving information regarding a state (i.e., channel number, application, screen, etc.), on exit from that state, sufficient to allow a user to return to that state.

2. Related Art

A typical cable television system comprises a television for displaying video presentations (hereinafter called "programs"), a program delivery system for delivering programs as electronic signals via coaxial cable, a settop box for interfacing the television to the program delivery system, and a remote control that permits a user, by controlling the settop box, to choose different programs. These programs are conventional broadcast programs over which the user has little control; i.e., the user can not pause, fast-forward, reverse, or stop any program, and is limited to those programs that are currently being broadcast. The user can only change to a different program.

In such a system, a typical remote control does, however, provide a number of convenient features to assist the user in changing channels. These include the "Channel-Up" and "Channel-Down" buttons, which allow a user to traverse television channels in increasing and decreasing numerical order, respectively; the "Favorite Channel" button, which cycles through a predetermined number of the user's favorite channels; and the "Last Channel" button, which toggles between the current channel and the channel last entered on the remote control's numeric keypad.

In contrast to a typical cable system, a typical interactive television system (ITV) includes not only conventional broadcast programs, but also interactive programs which the user can control. Each interactive program can comprise a number of applications, screens and options. Once a user has "navigated" to a particular "state" within an interactive program (i.e., used the remote control to select a particular channel, application, screen and set of options), the user may wish to leave that state temporarily and return to it at a later time. What is needed is a method to permnit the user to quickly and easily return to a previously-selected state.

SUMMARY OF THE INVENTION

A typical interactive television system (ITV) includes not only "passive" channels that feature conventional broadcast programs, but also "interactive" channels which feature "interactive" programs that the user can control. These interactive programs can include video-on-demand, games, shopping, and the like, each of which can comprise a number of applications, screens and options. Once a user has "navigated" to a particular "state" within an interactive program (i.e., used the remote control to select a particular application, screen and set of options), the user may wish to leave that state temporarily and return to it at a later time. The present invention provides this feature, which the user invokes by pressing the "Return" button on the remote control.

The present invention is a system and method for permitting a user in an ITV system to return to a previously-selected state. The ITV system of the present invention includes a number of remote servers which contain interactive applications and television settop computers for downloading, presenting and managing those applications. The user employs a remote control to select television channels, each of which can be passive or interactive. When a user selects an interactive channel, the settop computer downloads and launches the corresponding application(s).

In a preferred embodiment of the present invention, the settop computer saves state information, called the "return state", whenever a user exits a state in an interactive channel without pressing the "Return" button. When the user presses the "Return" button, there is no need to save the return state, as will be described below. Return states are saved in a last-in, first-out (LIFO) buffer, called the "return state stack," so that, as the user navigates from state to state, each state's return state is saved in turn on top of the return state stack. When the "Return" button is pressed, the settop computer "pops" the top return state from the return state stack and uses it to restore the most recent previously-accessed state. The user can return to a number of previously-accessed states by pressing the "Return" button an appropriate number of times. The number of return states that can be saved is limited only by the capacity of the return state stack.

One advantage of the present invention is to permit a user in an ITV system to quickly and easily return to a previously-selected state. Specifically, this invention allows ready access to a mixture of conventional broadcast programming and interactive applications behind a common and familiar "channel surfing" interface. This delivery method contrasts sharply with existing interfaces to interactive applications, such as those found on personal computers or video game systems.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

I. The Interactive Television System

The present invention is a system and method for permitting a user of an interactive television (ITV) system to return to a previously-selected "state." For the purposes of this disclosure, a "state" is defined as a channel, application, screen, selected options, and the like as further defined below.

Figure 1:
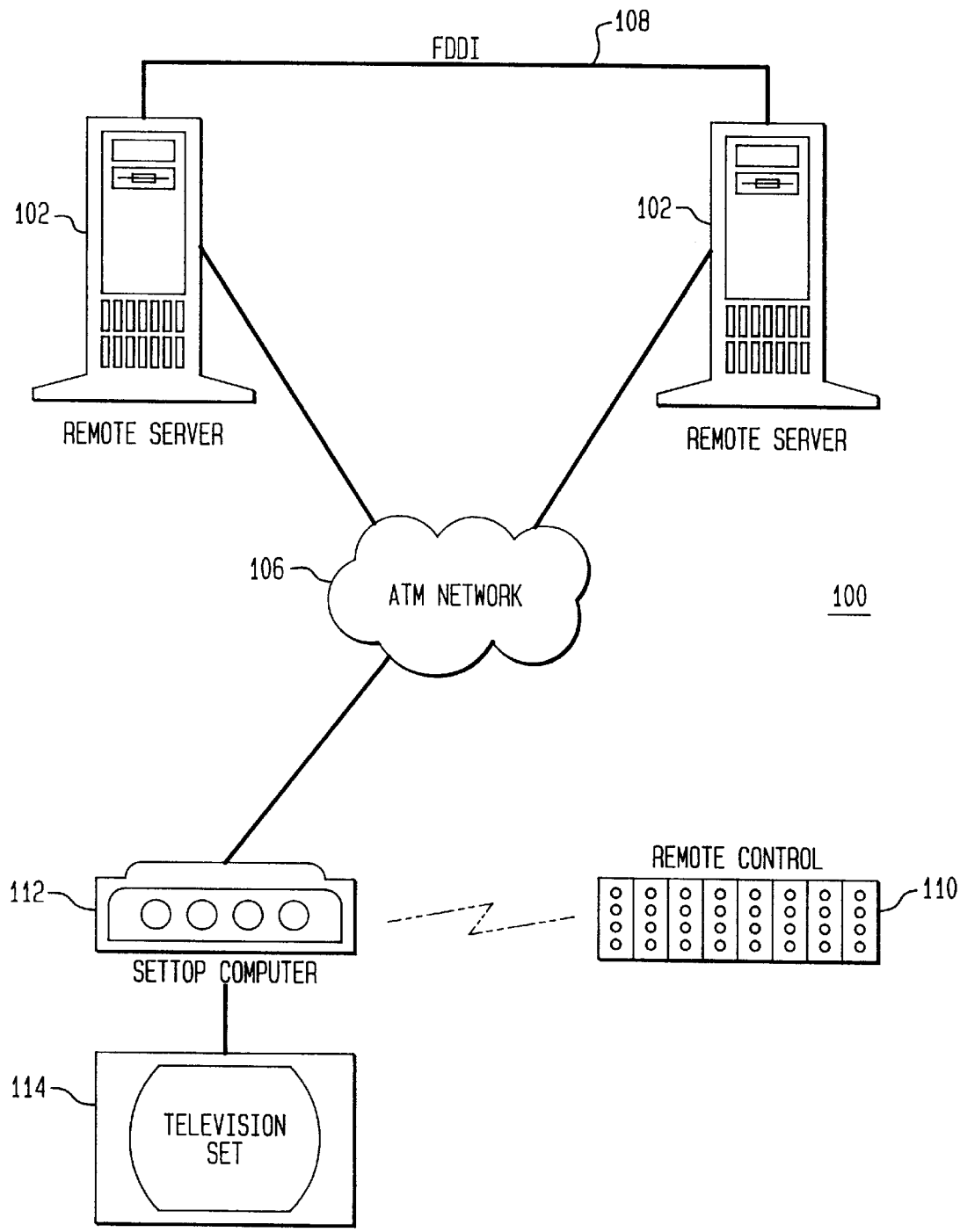
FIG. 1 is a block diagram of an ITV system in connection with the present invention.

FIG. 1 is a block diagram of an ITV system in connection with the present invention. ITV system 100 comprises remote servers 102, Asynchronous Transfer Mode (ATM) network 106, Fiber Distributed Data Interface (FDDI) network 108, remote control 110, settop computers 112 and television set 114. Remote servers 102 are interconnected via FDDI network 108, and are connected via an ATM network 106 to settop computers 112. A settop computer 112 is the interface between television set 114 and remote servers 102. The user (not shown) controls settop computer 112 using remote control 110 while observing responsive feedback on the display of television set 114, thereby interacting with ITV system 100 via settop computer 112.

ITV system 100 features both "passive" and "interactive" channels. A "passive" channel corresponds to a conventional broadcast television channel, while an "interactive" channel is a television channel that supports interactive programs. The user can select television channels, whether passive or interactive, using remote control 110. Each interactive channel comprises at least one viewer application, which is a computer application designed to deliver interactive programs to, and accept and respond to input from, the user. Each viewer application can comprise a number of screens and options. Once a user has navigated to a particular state within an interactive program (i.e., used the remote control to select a particular application, screen and set of options), the user may wish to leave that state temporarily and return to it at a later time. A typical example of this is when the user changes channels to see what else is available. To return to a previously-selected state the user simply presses the "Return" button on remote control 110.

Figure 2:
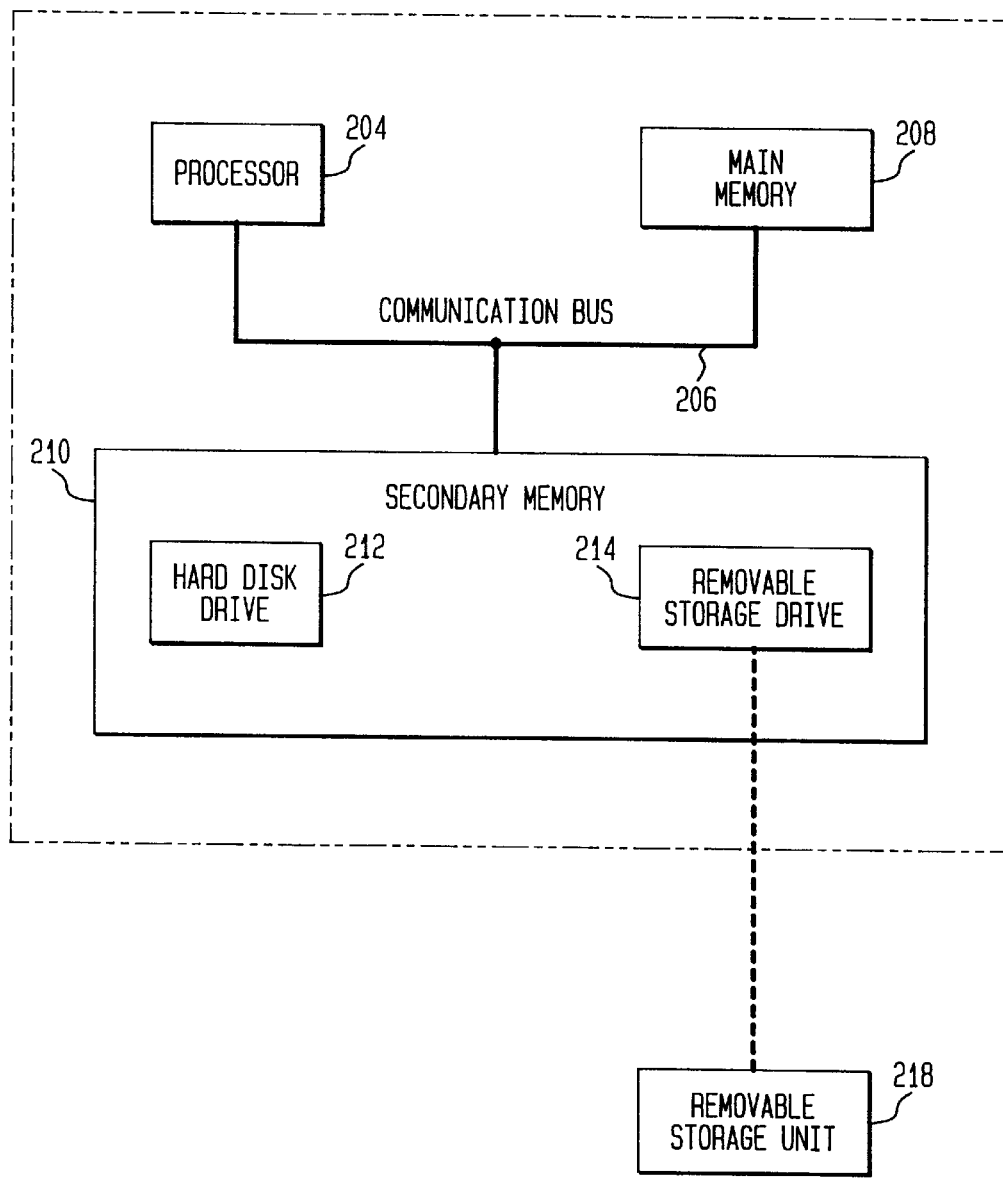
FIG. 2 depicts an exemplary computer system according to one embodiment of the present invention.

In one embodiment, the present invention is directed to a computer system 200 operating as discussed herein. An exemplary hardware configuration for computer system 200 is shown in FIG. 2. Computer system 200 includes one or more processors, such as processor 204. The processor 204 is connected to a communication bus 206.

Computer system 200 also includes a main memory 208, preferably random access memory (RAM), and an optional secondary memory 210. Secondary memory 210 may be local to processor 204 or remote. In a preferred embodiment of the present invention, secondary memory 210 resides in remote servers 102. In an alternative embodiment of the present invention, secondary memory 210 resides in a local hardware cartridge or state machine. In another alternative embodiment of the present invention, secondary memory 210 may be partitioned into local and remote portions. The secondary memory 210 can include, for example, a hard disk drive 212 and a removable storage drive 214 (representing a floppy disk drive, a magnetic tape drive, a compact disk drive, or the like). The removable storage drive 214 reads from and/or writes to a removable storage unit 218 in a well known manner.

Removable storage unit 218, also called a program storage device or a computer program product, represents a floppy disk, magnetic tape, compact disk, etc. As will be appreciated, the removable storage unit 218 includes a computer usable storage medium having stored therein computer software and/or data.

Computer programs (also called computer control logic) are stored in main memory 208 and/or the secondary memory 210. Such computer programs, when executed, enable computer system 200 to perform the features of the present invention as discussed herein. In particular, the computer programs, when executed, enable the processor 204 to perform the features of the present invention. Accordingly, such computer programs represent controllers of the computer system 200.

In another embodiment, the invention is directed to a computer program product comprising a computer readable medium having control logic (computer software) stored therein. The control logic, when executed by the processor 204, causes the processor 204 to perform the functions of the invention as described herein.

In still another embodiment, the invention is implemented primarily in hardware using, for example, a hardware state machine. Implementation of the hardware state machine so as to perform the functions described herein will be apparent to persons skilled in the relevant art(s).

Figure 3:
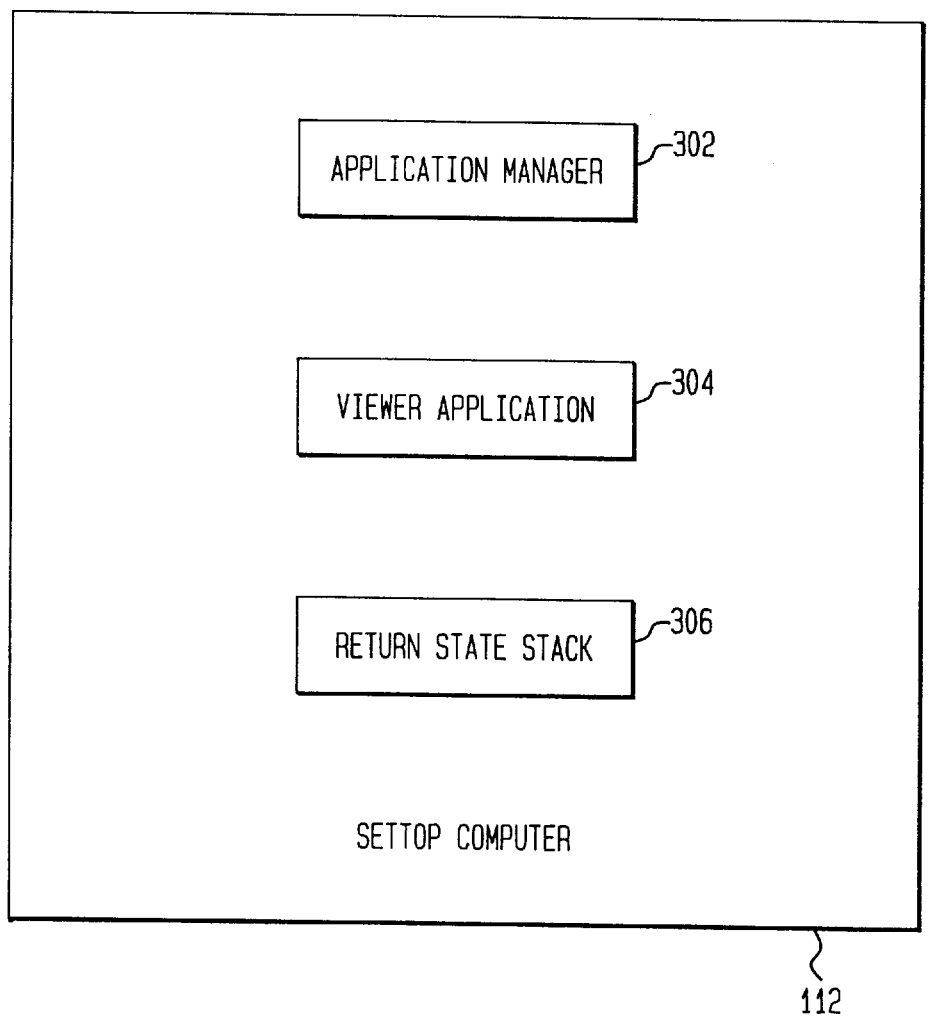
FIG. 3 depicts the settop software environment for settop computer 112.

FIG. 3 depicts the settop software environment for settop computer 112 according to the present invention. The settop software environment includes three components: an application manager 302, a viewer application 304, and a return state stack 306. Application manager 302, viewer application 304, and return state stack 306, when executed, enable settop computer 112 to perform the features of the present invention as discussed herein. Thus, application manager 302, viewer application 304, and return state stack 306 represent controllers of settop computer 112. The components of the settop software environment are described below.

Application manager 302 causes viewer applications 304 to be executed on a settop computer 112. Application manager 302 is downloaded when settop computer 112 is powered on and is responsible for downloading, managing and terminating all other resident applications. As will be discussed below, application manager 302 is also responsible for saving and restoring states.

Viewer application 304, downloaded by application manager 302 from a remote server 102, is the primary application running on settop computer 112. Examples of viewer applications 304 are video-on-demand, home shopping, personal finance services, gaming applications, and the like. Only one viewer application 304 runs on settop computer 112 at a time.

In operation, remote servers 102 store the control logic for a number of applications including viewer applications 304 and application manager 302. When settop computer 112 is powered on, application manager 302 is downloaded from remote server 102. The user then employs remote control 110 to select television channels, whether passive or interactive, by interacting with application manager 302. Each interactive channel can represent one or more viewer applications 304. When a user selects a viewer application 304, application manager 302 downloads that application to settop computer 112 and launches it for viewing.

Return state stack 306 functions as a last-in, first-out (LIFO) buffer. Each entry in return state stack 306 represents a "return state", which is a set of information sufficient to restore (i.e., "initialize") a particular state that has been saved by application manager 302. As will be described more fully below, a return state is "pushed" onto return state stack 306 when a state is saved, and is "popped" from return state stack 306 when a state is restored.

Figure 4:
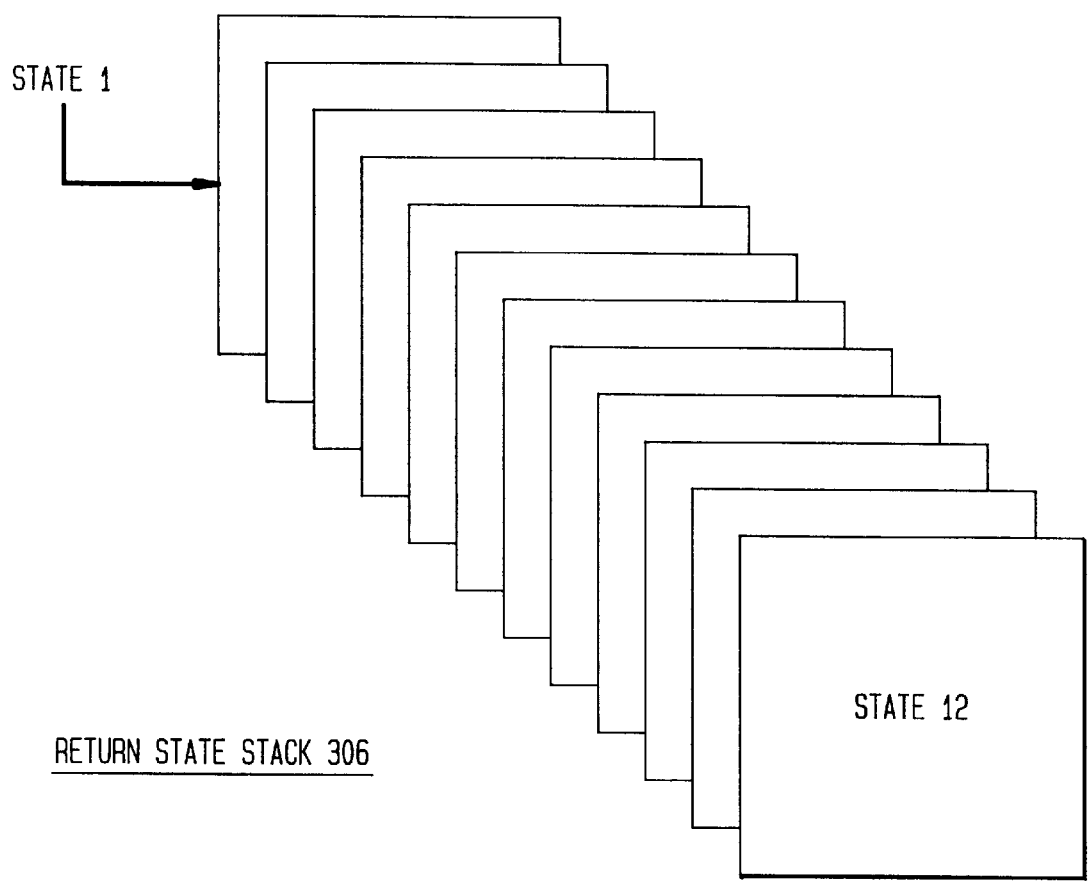
FIG. 4 depicts return state stack 306 according to a preferred embodiment of the present invention.

FIG. 4 depicts return state stack 306. In a preferred embodiment, return state stack 306 can hold at least 20 return states. In FIG. 4, return state stack 306 contains 12 return states. If the user were to press the "Return" button once, application manager 302 would restore state 12; if the user were to press the "Return" button a second time, application manager 302 would restore state 11, and so on. It should be noted that this function of the "Return" button differs significantly from that of the "Last Channel" button described above. The "Last Channel" button is merely a toggle switch that changes between two channels, while the "Return" button function of the present invention allows the user to retrace his steps, limited only by the depth of return state stack 306.

Figure 5:
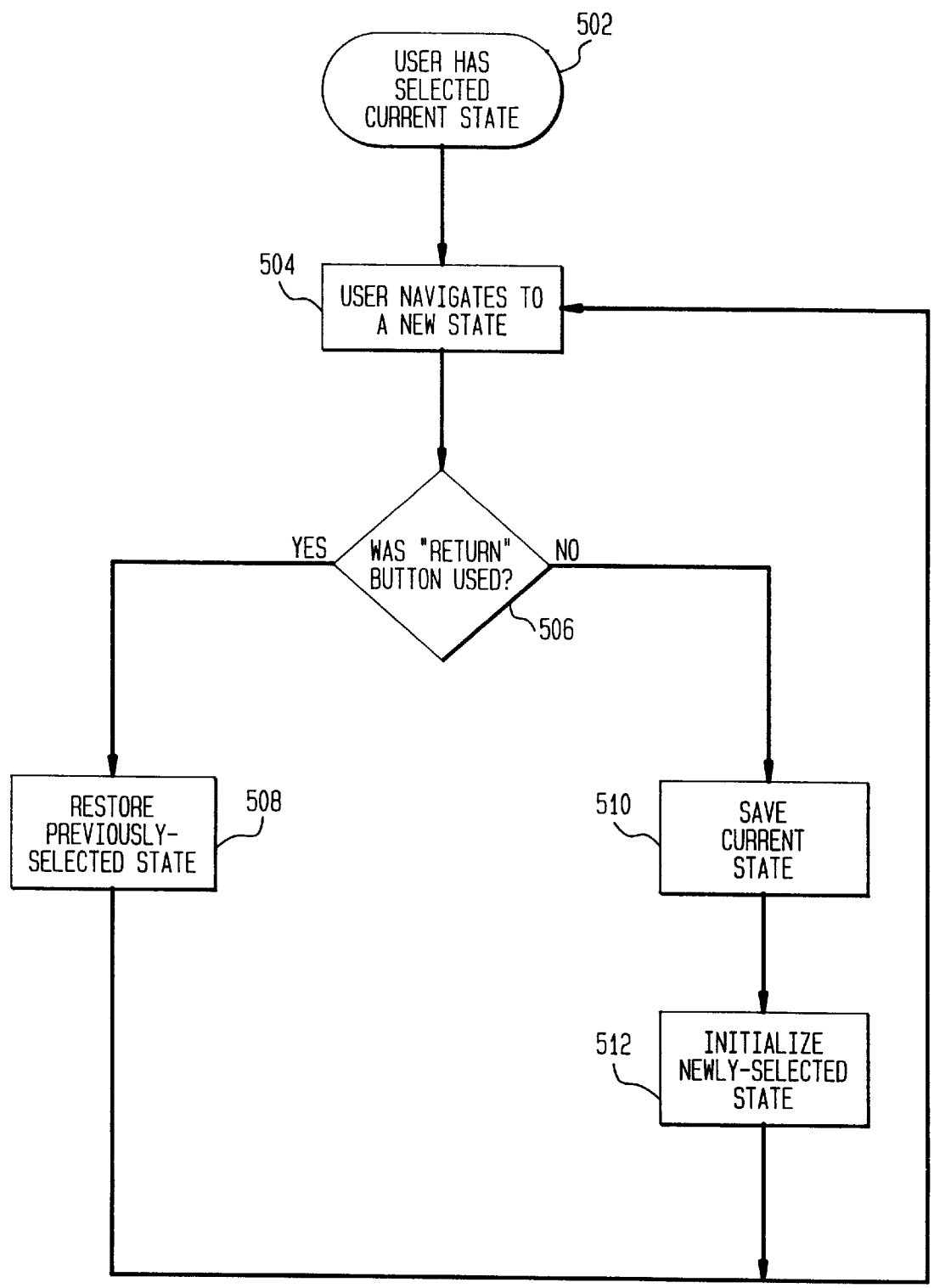
FIG. 5 is a flowchart depicting the operation of settop computer 112.

FIG. 5 is a flowchart depicting the operation of settop computer 112. In this flowchart and those that follow, the following conventions are employed: a rounded box indicates a step in which a process starts or stops, a diamond-shaped box indicates a decision step that results in a branch, and a rectangular box indicates a step in which some action transpires. As shown at step 502, a user has selected a particular state in a particular viewer application 304 (hereinafter referred to as the "current state"). As shown at step 504, the user employs remote control 110 to select a new state, whether by pressing the "Return" button or by another method, such as entering a channel number or following a link. As shown at step 506, application manager 302 determines whether the "Return" button was used to change channels. If yes, then as shown at step 508, application manager 302 restores the previously-selected state; the operation of settop computer 112 then returns to a step 502. If no, application manager 302 first saves the current state as shown at step 510, then initializes the newly-selected state as shown at step 512. The operations of steps 508 and 510 are discussed in more detail below.

II. Saving a State

Figure 6:
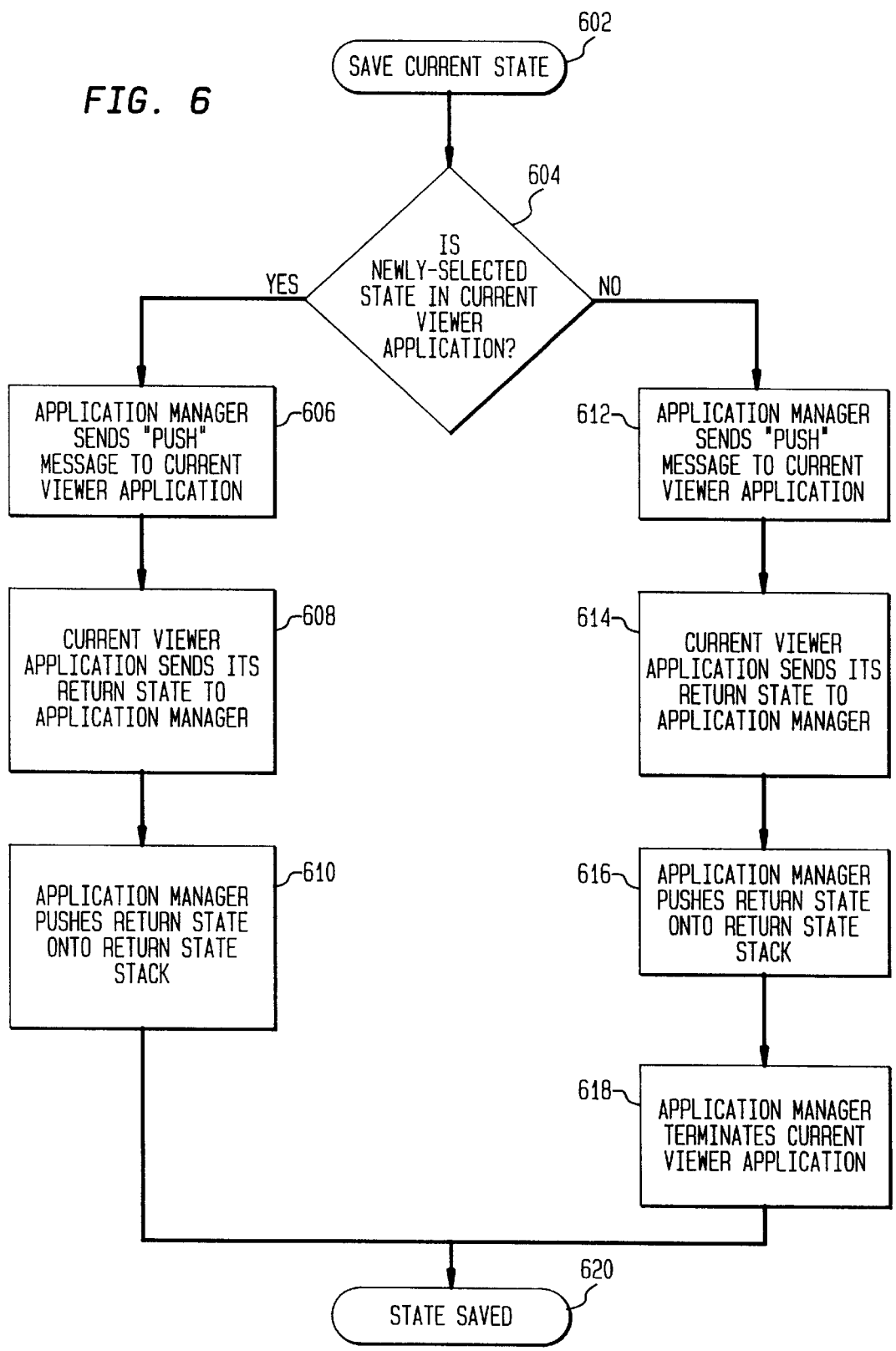
FIG. 6 is a flowchart depicting the operation of settop computer 112 in saving a state, corresponding to step 510 in FIG. 5.

FIG. 6 is a flowchart depicting the operation of settop computer 112 in saving a state, corresponding to step 510 in FIG. 5; this operation is now described with reference to FIG. 6. As shown at step 602, the state-saving function has been invoked; therefore, application manager 302 will save the current state. As shown at step 604, application manager 302 first determines whether the newly-selected state is within the current viewer application 304

If the newly-selected state is within the current viewer application 304 (the "Y" branch from step 604), then that viewer application is not terminated. As shown at step 606, application manager 302 sends a "push" message to viewer application 304, causing viewer application 304 to send its return state to application manager 302, as shown at step 608. Application manager 302 then "pushes" the return state onto return state stack 306, as shown at step 610. As shown at step 620, the current state has been saved.

If the newly-selected state is not within the current viewer application 304 (the "N" branch from step 604), then that viewer application is terminated. As shown at step 612, application manager 302 sends a "push" message to current viewer application 304, causing current viewer application 304 to send its return state to application manager 302, as shown at step 614. As shown at step 616, application manager 302 then "pushes" the return state onto return state stack 306. As shown at step 618, application manager 302 terminates current viewer application 304. As shown at step 620, the current state has been saved.

III. Restoring a State

Figure 7:
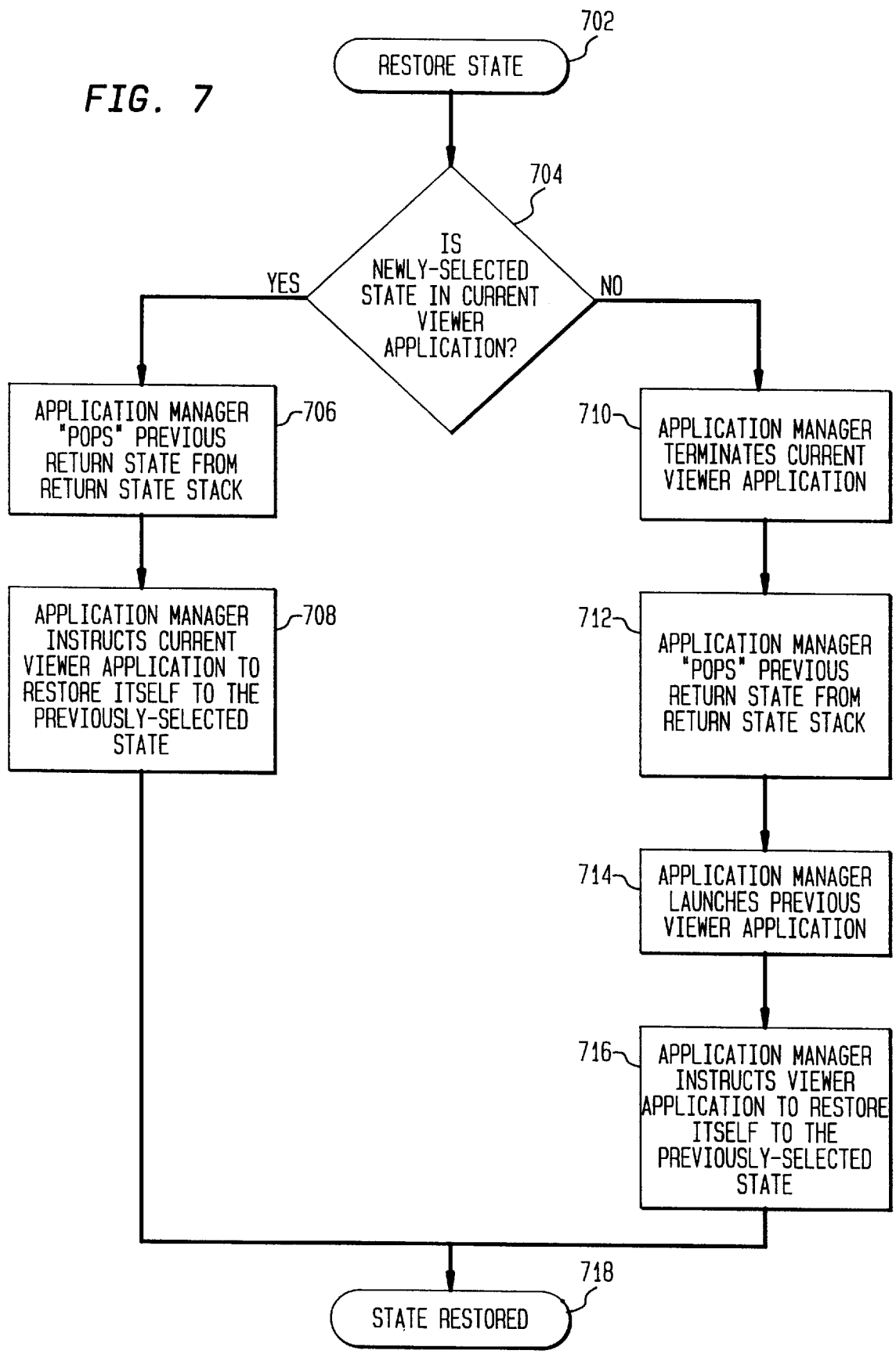
FIG. 7 is a flowchart depicting the operation of settop computer 112 in restoring a state, corresponding to step 508 in FIG. 5.

FIG. 7 is a flowchart depicting the operation of settop computer 112 in restoring a previously-selected state, corresponding to step 508 in FIG. 5. As shown at step 702, the state-restoring function has been invoked; therefore, application manager 302 will restore the current state. As shown at step 704, application manager 302 determines whether the previously-selected state is within the current viewer application 304.

If the previously-selected state is within the current viewer application 304 (the "Y" branch from step 704), then that application is not terminated. As shown at step 706, application manager 302 "pops" the previous return state from return state stack 306. As shown at step 708, application manager 302 instructs current viewer application 304 to restore the previously-selected state in the current viewer application 304 using the previous return state. As shown at step 718, the previously-selected state has been restored.

If the previously-selected state is not within the current viewer application 304 (the "N" branch from step 704), then that application is terminated. As shown at step 710, application manager 302 terminates current viewer application 304. As shown at step 712, application manager 302 "pops" the previous return state from return state stack 306. As shown at step 714, application manager 302 launches the previous viewer application 304. As shown at step 716, application manager 302 instructs current viewer application 304 to restore the previously-selected state in the newly-launched viewer application 304 using the previous return state. As shown at step 718, the previously-selected state has been restored.

IV. An Example

The following is an example to illustrate the operation of the present invention. Consider an interactive television channel designed to simulate a shopping mall. The channel includes a number of viewer applications 304, each of which represents a store in the shopping mall; two of these stores are Store X and Store Y. A user has been navigating through the screens in the Store X viewer application 304 and has tentatively selected a sweater in the screen representing the Store X sweater counter. However, before purchasing the sweater, the user would like to see the offerings at Store Y, which is represented by a different viewer application 304. When the user navigates to Store Y (by a method other than pushing the "Return" button), application manager 302 pushes a return state onto return state stack 306. The return state specifies, for later recall, the Store X viewer application 304, the sweater counter screen and the sweater highlighted on the screen.

The user then navigates through the Store Y viewer application 304 and browses through its sweaters. Eventually satisfied with her original selection, the user decides to return to the Store X sweater counter to purchase the sweater she had previously selected. When she presses the "Return" button to navigate back to the sweater counter at Store X, application manager 302 terminates the Store Y viewer application 304, "pops" the saved return state from return state stack 306, and launches the Store X viewer application 304 using the "popped" return state. Thus application manager 302 restores the state described by the Store X sweater counter and the previously-selected sweater.

V. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. In an interactive television system, a settop computer, configured to save and restore a plurality of states, comprising:

a viewer application, said viewer application comprising at least one state;

an application manager for causing said viewer application to execute; and a return state stack configured to store a plurality of return states, wherein said application manager is configured to save a return state by pushing said return state onto a top of said return state stack upon user exit from a state, and cause said viewer application to restore said state in response to a user request by popping said return state from said top of said return state stack, wherein if a plurality of return states are stored on said return state stack, each additional user request will pop an additional return state from said top of said return state stack.

2. A computer program product comprising a computer useable medium having computer readable program code means embodied in said medium for causing a processor in a settop computer in an interactive television system to save and restore states, said computer readable program code means comprising:

at least one viewer application, said viewer application comprising at least one state;

an application manager for causing said viewer application to execute; and a return state stack configured to store a plurality of return states, wherein said application manager is configured to save a return state by pushing said return state onto a top of said return state stack upon user exit from a state, and cause said viewer application to restore said state in response to a user request by popping said return state from said top of said return state stack, wherein if a plurality of return states are stored on said return state stack, each additional user request will pop an additional return state from said top of said return state stack.

3. In an interactive television system, a method for enabling a user to return to previous states, comprising the steps of:

(a) saving a return state on a return state stack configured to store a plurality of return states by pushing said return state onto a top of said return state stack when the user leaves a first state by selecting a second state; and (b) retrieving said return state from said return stack by popping said return state from said top of said return state stack and using said return state to restore said first state when the user elects to return to said first state from said second state.

4. The method of claim 3, wherein step (a) further comprises the step of:

(i) terminating the current viewer application if said second state is not within said current viewer application.

5. The method of claim 3, wherein step (b) further comprises the step of:

(i) terminating the current viewer application and launching the viewer application comprising said first state if said second state is not within said current viewer application.

6. A computer program product comprising a computer useable medium having computer readable program code means embodied in said medium for causing a processor in a settop computer in an interactive television system to save and restore states, said computer readable program code means comprising:

a computer readable first program code means for causing the processor to save a return state on a return state stack configured to store a plurality of return states by pushing said return state onto a top of said return state stack when a user leaves a first state by selecting a second state; and a computer readable second program code means for causing the processor to retrieve said return state from said return state stack by popping said return state from said top of said return state stack and using said return state to restore said first state when a user elects to return to said first state.

7. The computer program product of claim 6, wherein said computer readable first program code means further comprises a computer readable third program code means for enabling the processor to terminate the current viewer application if said second state is not within said current viewer application.

8. The computer program product of claim 6, wherein said computer readable second program code means further comprises a fourth computer readable program code means for enabling the processor to terminate the current viewer application and launch the viewer application comprising said first state if said second state is not within said current viewer application.

* * * * *